J. R. STIEGELMEYER.
LOAD EQUALIZING CAR BRAKE.
APPLICATION FILED JAN. 9, 1911.
1,007,155.
Patented Oct. 31, 1911.
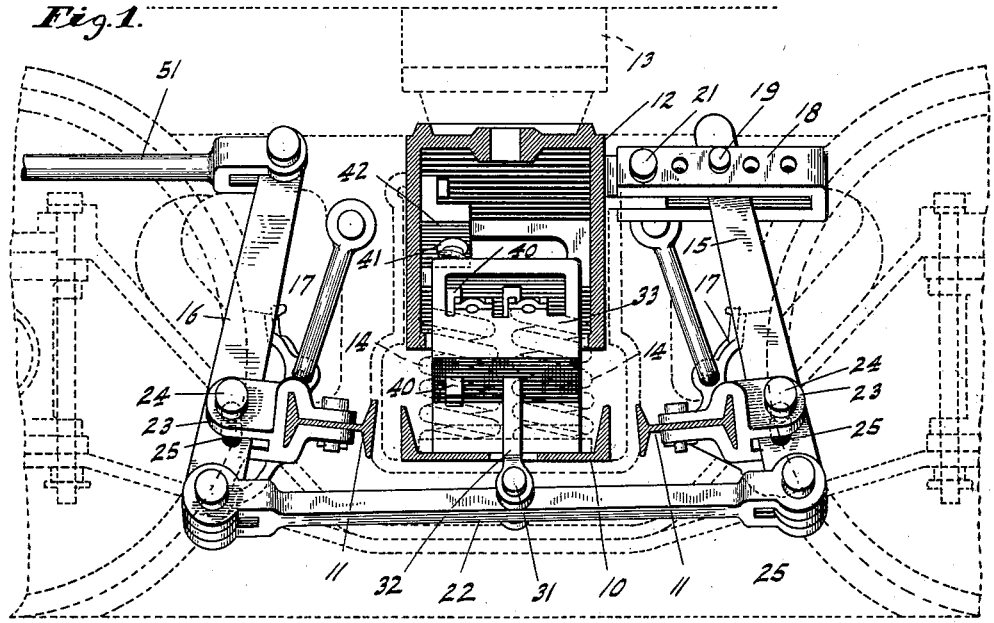
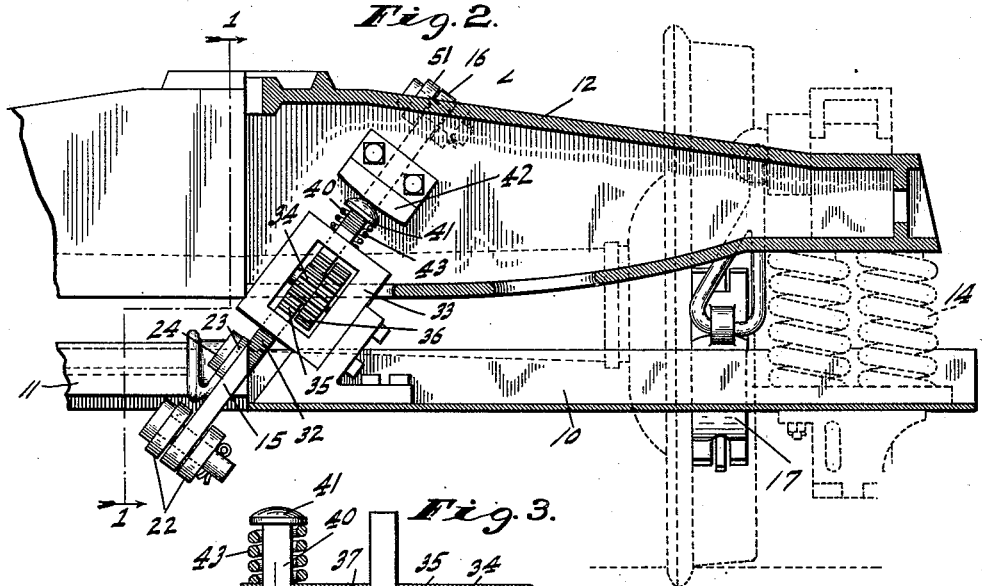
Witnesses
Frank O. Fahle
Thomas H. McMeans
Inventor
John R. Stiegelmeyer,
By Bradford Hood
Attorneys.

UNITED STATES PATENT OFFICE.

JOHN R. STIEGELMEYER, OF INDIANAPOLIS, INDIANA.

LOAD-EQUALIZING CAR-BRAKE.

1,007,155.        Specification of Letters Patent.      Patented Oct. 31, 1911.

Application filed January 9, 1911. Serial No. 601,533.

*To all whom it may concern:*

Be it known that I, JOHN R. STIEGELMEYER, a citizen of the United States, residing at Indianapolis, in the county of Marion and State of Indiana, have invented a new and useful Load-Equalizing Car-Brake, of which the following is a specification.

The amount of braking force which may be applied to the wheels of a vehicle without causing said wheels to slip upon the roadway varies directly with the weight of the vehicle and the object of my present invention is to produce a construction by means of which an increase of weight of the vehicle will automatically affect the brake mechanism in such manner as to permit the application of a braking force varied directly as the variation of weight.

The apparatus is more or less especially designed for use upon railroad freight cars where there is a very material variation of weight in loaded or unloaded condition, but the invention may also be applied to other vehicles.

The accompanying drawings illustrate my invention, as applied to an ordinary railroad freight car truck.

Figure 1 is a section on line 1—1 of Fig. 2; Fig. 2 a partial vertical section of the structure shown in Fig. 1 in a plane at right angles to the sectional plane of Fig. 1, and Fig. 3 a detail section of the principal portion of my apparatus.

In the drawings, 10 indicates the main lower beam of a freight car truck of any desired type; 11—11 the brake beams; 12 the bolster upon which the body of the car, indicated at dotted lines at 13, is supported; 14 the springs arranged between the main beam 10 and the bolster 12; 15 the dead lever of the brake system, and 16 the live lever; 17 the brake shoes; 18 the yoke to which the upper end of the dead lever 15 is pivotally connected at 19; 21 the pivot pin for the yoke 18, and 22 a link which connects the short arms of the dead lever 15 and the live lever 16. All of these parts are of ordinary and usual construction and the particular type shown in the drawings is merely for illustrative purposes. In the ordinary construction, the two levers 15 and 16 are pivotally connected to the adjacent brake beams 11 by a bracket 23 and pivot pin 24, the pivotal connection being a fixed one so that the two arms of each of the levers 15 and 16 have a fixed relationship. At this point my structure departs from the common construction because I provide each of these levers with a slot 25 through which the pins 24 pass so that the levers 15 and 16 may be shifted upon their pivot pins so as to vary the relationship of the two arms of each lever, and in the particular type shown in the drawings, these two slots, while they run in a general direction lengthwise of their respective levers, are preferably so arranged as to be parallel with each other for convenience in permitting a shifting of the levers upon their pivots. It will be understood, of course, that any other desirable construction by means of which a variation of the effective proportions of the levers may be accomplished, will be the full equivalent of the structure illustrated.

In order to shift the two levers 15 and 16 on their pivots automatically in accordance with the load condition of the body of the car 13, I provide the following mechanism: Connected at 31 to link 22 is plunger 32 which is projected through a gear casing 33 firmly secured to the beam 10. Journaled in casing 33 is a pinion 34 which meshes with a rack 35 formed in plunger 32, and pinion 34 carries a gear 36. Gear 36 meshes with another gear 37 to which is connected a pinion 38 which meshes with a rack 39 formed in a plunger 40, also projected through casing 33. The plunger 40 is provided at one end with a head 41 which is arranged to be engaged by a finger 42 secured to bolster 12 and, if desired, a spring 43 is provided to normally keep head 41 in engagement with the bolster finger 42. Gears 36 and 37 are preferably eccentric or cam shaped gears so that rotation of pinion 38 will variably affect the amount of rotation of pinion 34. This arrangement of gears is for the reason that the first thousand pounds placed in the car will compress springs 14 to a greater extent than will the last thousand pounds of say a forty thousand pound load, but the addition or substraction of each thousand pounds of load should have practically a uniform effect as to the variation of leverage of the levers 15 and 16 upon the brake shoes.

In operation and with an unloaded car, bolster 12 will be at its uppermost position away from beam 10 and the weight of the levers 15 and 16 and link 22, together with the action of spring 43, if such spring is provided, will serve to place the parts in the position shown in Fig. 1 where a given pull upon the pull rod 51, attached to the live lever 16, will produce a minimum effect upon the brake shoes, this minimum effect being the maximum braking force which is permissible to get maximum braking action upon the wheels without causing the wheels to slip upon the roadway. Upon the addition of a load into or upon the car body 13, the traction of the vehicle upon the roadbed will be correspondingly increased and consequently a greater braking force may be applied to the brake shoes before slippage will occur. The addition of this load causes a compression of springs 14 and, as the bolster 12 descends, the bolster finger 42 is driven against head 41 of plunger 40 and said plunger is therefore driven into the casing 33 so as to rotate gears 38, 36 and 34, and thus move the plunger 32 upwardly an amount corresponding to the additional load. This movement shifts the levers 15 and 16 upon their respective pivot pins 24 so as to lengthen the long arms of the levers and shorten the short arms and consequently the application of the same pull upon the pull rod 51 will apply a greater braking force through the brake shoes 17 to the traction wheels.

The exact shape of the several gears connecting the two plungers will, of course, be dependent upon the particular construction of the brake elements and the variation of the several portions of this train of gearing will be merely a matter of computation and design.

I claim as my invention:

1. The combination, with a vehicle comprising supporting wheels, a load-carrying body, and load-carrying springs interposed between said body and wheels, of a braking mechanism carried by the vehicle and comprising two brake beams, a pair of levers pivotally associated with said brake beams, and intermediate connections between said pair of levers and the load-carrying body for simultaneously and automatically varying the leverage relationship of said levers to said brake beams.

2. The combination, with a vehicle comprising supporting wheels, a load-carrying body, and load-carrying springs interposed between said body and wheels, of a braking mechanism carried by the vehicle and comprising two brake beams, a pair of levers pivotally associated with said brake beams by connections permitting shifting of said levers relative to the brake beams to vary the leverage thereon, a link connecting the two levers, and a connection between said link and the load-carrying body for automatically shifting said link laterally to simultaneously shift the levers relative to their respective beams upon variation of the load applied to the load-carrying body.

3. The combination with a vehicle comprising supporting wheels, a load carrying body, and load carrying springs interposed between said body and wheels, of a braking member carried by said vehicle, a lever connected to said braking member, a pivot for said lever associated therewith in such manner that the arm proportion of such lever may be varied, means for producing such lever arm variation by variation of load applied to the load carrying body, said means comprising a pair of plungers, one arranged to be engaged by the load carrying member and the other arranged to operate upon the lever and its pivot, and intermediate gearing connecting said two plungers, said intermediate gearing comprising a pair of intermeshing eccentric gears whereby movement of the load affected plunger will variably affect the other plunger.

4. The combination with a vehicle comprising supporting wheels, a load carrying body, and load carrying springs interposed between said body and wheels, of a braking member carried by said vehicle, a lever connected to said braking member, a pivot for said lever associated therewith in such manner that the arm proportion of such lever may be varied, means for producing such lever arm variation by variation of load applied to the load carrying body, said means comprising a pair of plungers, one arranged to be engaged by the load carrying member and the other arranged to operate upon the lever and its pivot, and intermediate gearing connecting said two plungers.

In witness whereof, I have hereunto set my hand and seal at Indianapolis, Indiana, this third day of January, A. D. one thousand nine hundred and eleven.

JOHN R. STIEGELMEYER. [L. S.]

Witnesses:
 ARTHUR M. HOOD,
 THOMAS W. MCMEANS.

Copies of this patent may be obtained for five cents each, by addressing the "Commissioner of Patents, Washington, D. C."